(12) United States Patent
Kuwamura

(10) Patent No.: US 10,534,562 B2
(45) Date of Patent: Jan. 14, 2020

(54) SOLID STATE DRIVE

(71) Applicant: Fujitsu Limited, Kawasaki-shi, Kanagawa (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/640,907

(22) Filed: Jul. 3, 2017

(65) Prior Publication Data

US 2018/0011663 A1    Jan. 11, 2018

(30) Foreign Application Priority Data

Jul. 5, 2016 (JP) .................................. 2016-133603

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC .... G06F 3/0679; G06F 3/0659; G06F 3/0611; G06F 9/3001; G06F 9/3004; G06F 15/785
USPC ........................................................ 711/103
See application file for complete search history.

(56) References Cited

U.S. PATENT DOCUMENTS

| 9,053,790 B1 * | 6/2015 | Hu ...................... G11C 13/0069 |
| 2007/0079076 A1 * | 4/2007 | Zhang ................... G06F 9/3824 711/143 |

FOREIGN PATENT DOCUMENTS

JP    2003-203486    7/2003

OTHER PUBLICATIONS

Jaeyoung Do et al., "Query Processing on Smart SSDs: Opportunities and Challenges" SIGMOD'13, pp. 1221-1230, 2013.

* cited by examiner

*Primary Examiner* — Hua J Song
(74) *Attorney, Agent, or Firm* — Staas & Halsey LLP

(57) ABSTRACT

A memory stores data, a memory interface circuit reads the data from the memory, and an arithmetic circuit performs a prescribed arithmetic operation on the data. A host interface circuit outputs an arithmetic request to the arithmetic circuit, and also outputs a reading instruction to the memory via the memory interface circuit, upon receipt of an arithmetic instruction from a host device. The host interface circuit receives, from the arithmetic circuit, an arithmetic result of the prescribed arithmetic operation performed on the data read from the memory via the memory interface circuit, and outputs the arithmetic result to the host device.

4 Claims, 11 Drawing Sheets

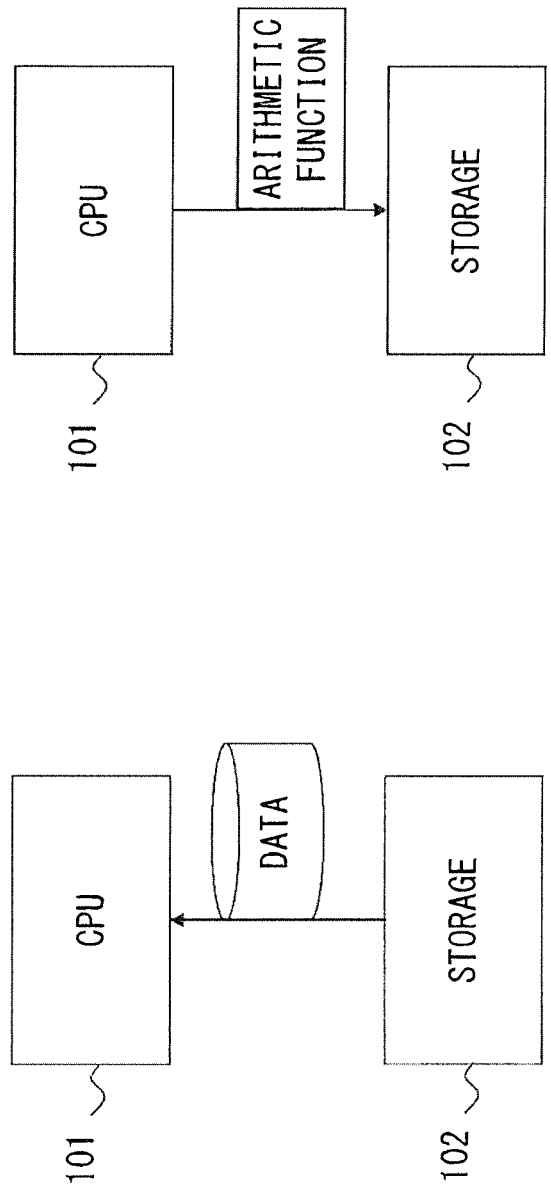

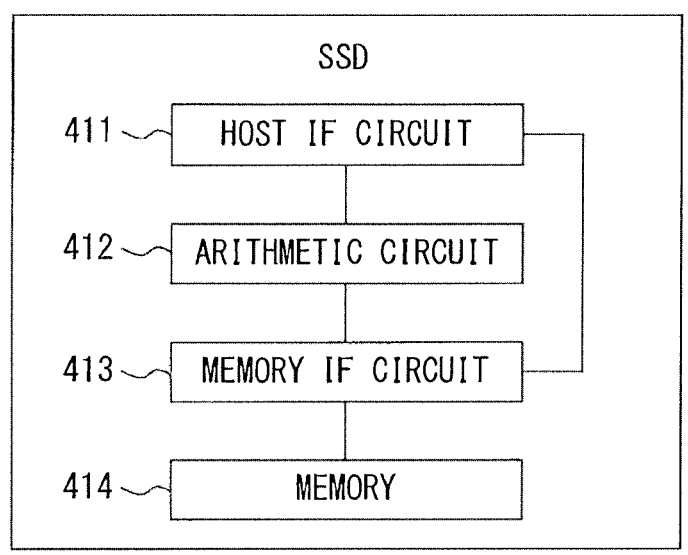
F I G. 4

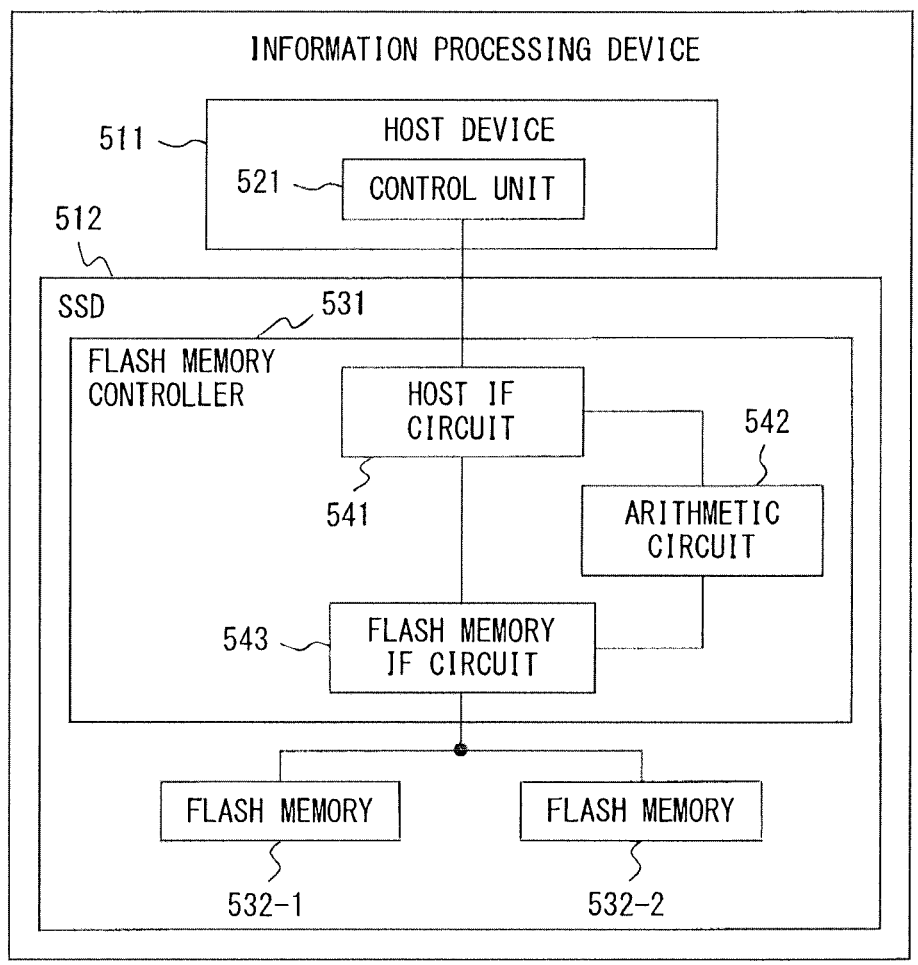
F I G. 5

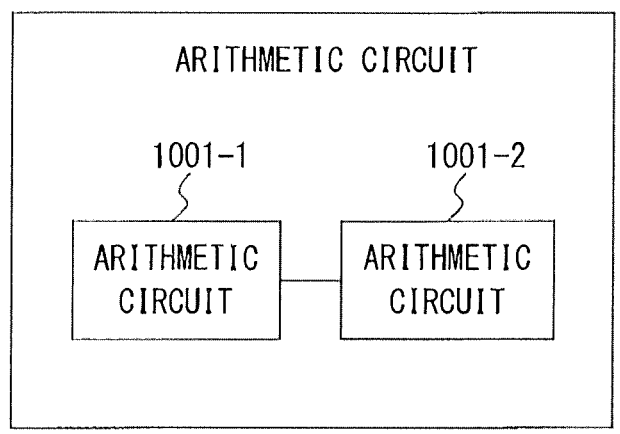
F I G. 1 0

SOLID STATE DRIVE

CROSS-REFERENCE TO RELATED APPLICATION

This application is based upon and claims the benefit of priority of the prior Japanese Patent Application No. 2016-133603, filed on Jul. 5, 2016, the entire contents of which are incorporated herein by reference.

FIELD

The embodiments discussed herein are related to a solid state drive (SSD).

BACKGROUND

In recent years, near-data processing has been proposed in which, in an information processing device, an arithmetic circuit is provided near data to perform an arithmetic operation instead of moving data from a storage to a central processing unit (CPU) to perform an arithmetic operation.

FIG. 1A illustrates an example of an arithmetic operation in a CPU, and FIG. 1B illustrates an example of near-data processing. In a case in which a CPU 101 performs an arithmetic operation, the CPU 101 reads data from a storage 102, and performs an arithmetic operation by using the read data, as illustrated in FIG. 1A. As the storage 102, a storage such as a hard disk drive (HDD) or an SSD is used. The SSD is a storage using a semiconductor memory.

In contrast, in near-data processing, an arithmetic function moves from the CPU 101 to the storage 102, as illustrated in FIG. 1B. In this case, the CPU 101 outputs an arithmetic instruction to the storage 102, and an arithmetic circuit provided in the storage 102 performs an arithmetic operation on data.

In the near-data processing above, a cost of data movement is reduced, and high-performance power-saving arithmetic processing can be expected. Therefore, the study have become active such that a workshop dedicated to near-data processing is held, for example.

FIG. 2 illustrates an exemplary configuration of a conventional SSD that performs near-data processing (see, for example, Non-Patent Document 1). An SSD 201 of FIG. 2 includes a flash memory controller 211, and a flash memory 212-1 to a flash memory 212-4. As the flash memory 212-1 to the flash memory 212-4, a NAND flash memory that is a non-volatile memory is used, for example.

The flash memory controller 211 includes a host interface circuit (a host IF circuit) 221, a dynamic random access memory (DRAM) 222, and a processor 223. The flash memory controller 211 further includes a flash memory interface circuit (a flash memory IF circuit) 224-1 and a flash memory IF circuit 224-2. The flash memory IF circuit 224-1 is connected to the flash memory 212-1 and the flash memory 212-2, and the flash memory IF circuit 224-2 is connected to the flash memory 212-3 and the flash memory 212-4.

Hereinafter, any of the flash memory 212-1 to the flash memory 212-4 may be referred to as a flash memory 212. In addition, any of the flash memory IF circuit 224-1 and the flash memory IF circuit 224-2 may be referred to as a flash memory IF circuit 224. Each of the flash memories 212 is referred to as a chip, and a transmission line between the flash memory IF circuit 224 and the flash memory 212 is referred to as a channel. Accordingly, the number of chips in the SSD 201 indicates the number of flash memories 212, and the number of channels indicates the number of flash memory IF circuits 224.

An erasure unit of data in each of the flash memories 212 is referred to as a block, and a reading/writing unit of data is referred to as a page. The size of one block is, for example, several megabytes, and the size of one page is, for example, several kilobytes to more than ten kilobytes.

The flash memory IF circuit 224-1 performs error correction on data read from the flash memory 212-1 and the flash memory 212-2. The flash memory IF circuit 224-2 performs error correction on data read from the flash memory 212-3 and the flash memory 212-4.

The processor 223 levels the number of times of rewriting by performing wear leveling for exchanging a block for which the number of times of rewriting is large and a block for which the number of times of rewriting is small. In addition, the processor 223 performs garbage collection for releasing an unneeded page in a block, by using the DRAM 222.

In general, physical information, such as the number of chips, the number of channels, the size of a block, or the size of a page, of the SSD 201 is hidden from a host device such as a CPU.

Upon receipt of an arithmetic instruction from a host device (not illustrated), the host IF circuit 221 outputs the received arithmetic instruction to the processor 223. The processor 223 reads data from the flash memory 212, stores the data in the DRAM 222, and performs an arithmetic operation by using the data. The processor 223 stores an arithmetic result in a main storage (not illustrated) via the host IF circuit 221.

A configuration in which data search is performed within a flash memory device is also known (see, for example, Patent Document 1).

Patent Document 1: Japanese Laid-open Patent Publication No. 2003-203486

Non-Patent Document 1: Jaeyoung Do et al., "Query Processing on Smart SSDs: Opportunities and Challenges," SIGMOD'13, pages 1221-1230, 2013.

SUMMARY

According to an aspect of the embodiments, a solid state drive includes a memory that stores data, a memory interface circuit that reads the data from the memory, an arithmetic circuit that performs a prescribed arithmetic operation on the data, and a host interface circuit.

The host interface circuit outputs an arithmetic request to the arithmetic circuit, and also outputs a reading instruction to the memory via the memory interface circuit, upon receipt of an arithmetic instruction from a host device. The host interface circuit receives, from the arithmetic circuit, an arithmetic result of the prescribed arithmetic operation performed on the data read from the memory via the memory interface circuit, and outputs the arithmetic result to the host device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A illustrates an arithmetic operation in a CPU;
FIG. 1B illustrates near-data processing;

FIG. 4 is a block diagram of an SSD according to the embodiments;

FIG. 5 is a block diagram of an information processing device;

FIG. 10 is a block diagram of an arithmetic circuit that performs plural different arithmetic operations.

DESCRIPTION OF EMBODIMENTS

Embodiments are described below in detail with reference to the drawings.

Figure 2:
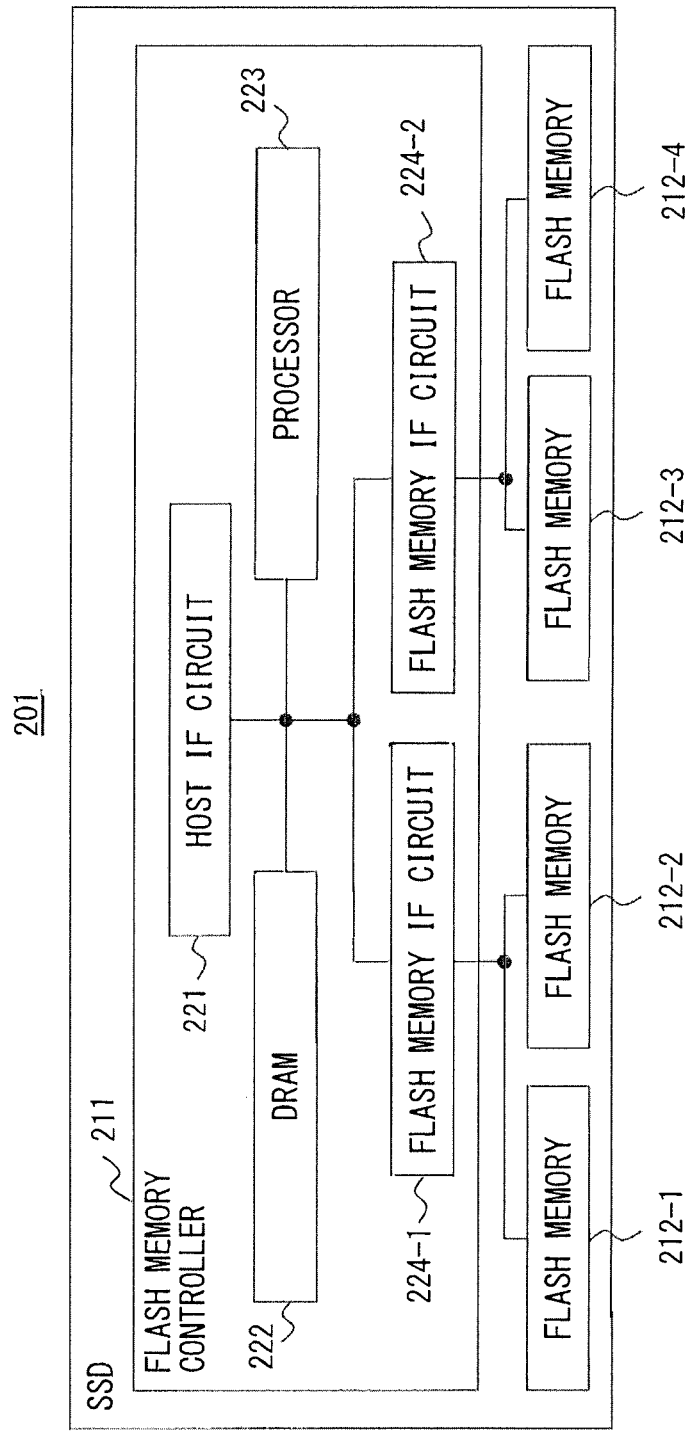
FIG. 2 is a block diagram of a conventional SSD.

In a case in which the SSD 201 of FIG. 2 is used, a host device indirectly controls the flash memories 212 via the processor 223 instead of directly controlling the flash memories 212. Therefore, physical information of the SSD 201 is hidden from the host device, and it is difficult for the host device to optimize data arrangement of the flash memory 212-1 to the flash memory 212-4. Further, in performing near-data processing, the flash memory controller 211 temporarily stores data read from the flash memory 212 in the DRAM 222, and performs near-data processing. Accordingly, near-data processing is performed at low speed.

The problems above do not arise only in an SSD using a flash memory, but also arise in an SSD using another semiconductor memory.

Figure 3:
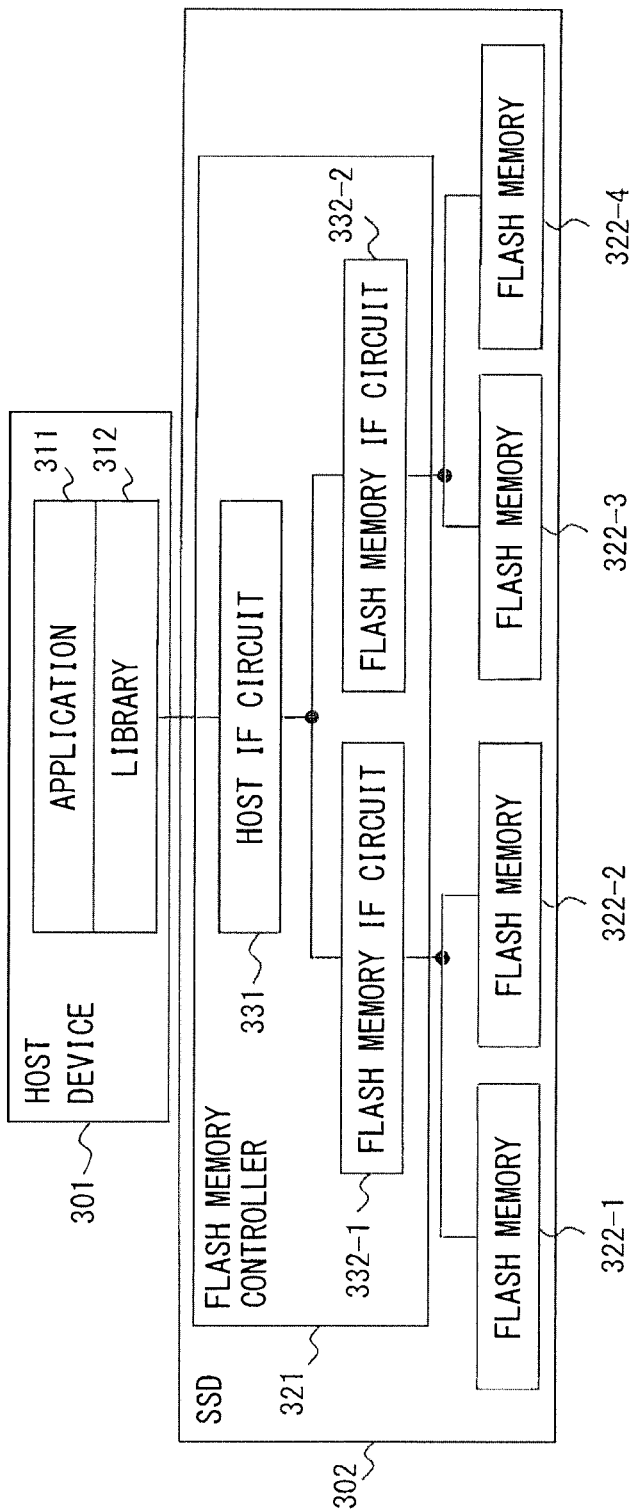
FIG. 3 is a block diagram of a software-defined SSD.

FIG. 3 illustrates an exemplary configuration of a software-defined SSD that can directly control a flash memory by using software. A host device 301 of FIG. 3 executes an application 311 or a library 312, and an SSD 302 includes a flash memory controller 321 and a flash memory 322-1 to a flash memory 322-4. The flash memory controller 321 includes a host IF circuit 331, a flash memory IF circuit 332-1, and a flash memory IF circuit 332-2.

In this case, the application 311 or the library 312 of the host device 301 manages physical information of the SSD 302, and controls wear leveling and garbage collection. Consequently, the host device 301 can distribute and arrange data to the flash memory 322-1 to the flash memory 322-4, and high-throughput low-latency high-speed reading processing and the like are realized. In addition, a DRAM does not need to be provided in the flash memory controller 321, and this enables the circuit scale of the flash memory controller 321 to be reduced.

However, in the SSD 302 of FIG. 3, a processor and a DRAM for wear leveling and garbage collection do not exist, and therefore it is desirable that near-data processing be performed by using another technology.

FIG. 4 illustrates an exemplary configuration of an SSD according to the embodiments. An SSD 401 of FIG. 4 includes a host IF circuit 411, an arithmetic circuit 412, a memory IF circuit 413, and a memory 414. The memory 414 stores data, the memory IF circuit 413 reads the data from the memory 414, and the arithmetic circuit 412 performs a prescribed arithmetic operation on the data.

Upon receipt of an arithmetic instruction from a host device, the host IF circuit 411 outputs an arithmetic request to the arithmetic circuit 412, and also outputs a reading instruction to the memory 414 via the memory IF circuit 413. The host IF circuit 411 receives, from the arithmetic circuit 412, an arithmetic result of the prescribed arithmetic operation that has been performed on the data read from the memory 414 via the host IF circuit 413, and outputs the arithmetic result to the host device.

By employing the SSD 401 of FIG. 4, an arithmetic operation can be performed on data at almost the same speed as the speed of reading data.

FIG. 5 illustrates an exemplary configuration of an information processing device using the SSD 401 of FIG. 4. An information processing device 501 of FIG. 5 includes a host device 511 and an SSD 512, and the information processing device 501 can be applied to various technologies such as big data processing, a database appliance, or a storage system. The host device 511 includes a control unit 521 that executes a program such as an application or a library. The control unit 521 is, for example, a CPU (a processor). The SSD 512 is a software-defined SSD, and the SSD 512 includes a flash memory controller 531, a flash memory 532-1, and a flash memory 532-2. The flash memory controller 531 includes a host IF circuit 541, an arithmetic circuit 542, and a flash memory IF circuit 543.

The host IF circuit 541 is connected to the control unit 521, the arithmetic circuit 542, and the flash memory IF circuit 543, and the flash memory IF circuit 543 is connected to the host IF circuit 541, the arithmetic circuit 542, the flash memory 532-1, and the flash memory 532-2.

Hereinafter, any of the flash memory 532-1 and the flash memory 532-2 may be referred to as a flash memory 532. The host IF circuit 541, the arithmetic circuit 542, the flash memory IF circuit 543, and the flash memory 532 respectively correspond to the host IF circuit 411, the arithmetic circuit 412, the memory IF circuit 413, and the memory 414 in FIG. 4.

In registering data in the SSD 512, the control unit 521 of the host device 511 distributes and writes the data to the flash memory 532-1 and the flash memory 532-2, and records a writing address. In using the data registered in the SSD 512, the control unit 521 issues a reading instruction or an arithmetic instruction to the SSD 512.

Upon receipt of the reading instruction from the host device 511, the host IF circuit 541 of the flash memory controller 531 outputs a reading instruction that specifies the host IF circuit 541 to be a data transfer destination to the flash memory IF circuit 543. The flash memory IF circuit 543 outputs the reading instruction to the flash memory 532, and the flash memory 532 outputs the data to the flash memory IF circuit 543. The flash memory IF circuit 543 outputs the data received from the flash memory 532 to the host IF circuit 541, and the host IF circuit 541 transfers the data received from the flash memory IF circuit 543 to the host device 511.

In addition, upon receipt of the arithmetic instruction from the host device 511, the host IF circuit 541 outputs an arithmetic request to the arithmetic circuit 542, and outputs a reading instruction that specifies the arithmetic circuit 542 to be a data transfer destination to the flash memory IF circuit 543. The flash memory IF circuit 543 outputs the reading instruction to the flash memory 532, and the flash memory 532 outputs the data to the flash memory IF circuit 543.

The flash memory IF circuit 543 outputs the data received from the flash memory 532 to the arithmetic circuit 542, and the arithmetic circuit 542 performs an arithmetic operation by using the data received from the flash memory IF circuit 543, and outputs an arithmetic result to the host IF circuit 541. The host IF circuit 541 transfers the arithmetic result received from the arithmetic circuit 542 to the host device 511. Examples of the arithmetic operation performed by the arithmetic circuit 542 include search for data stored in the flash memory 532 and a statistical operation on data.

Figure 6:
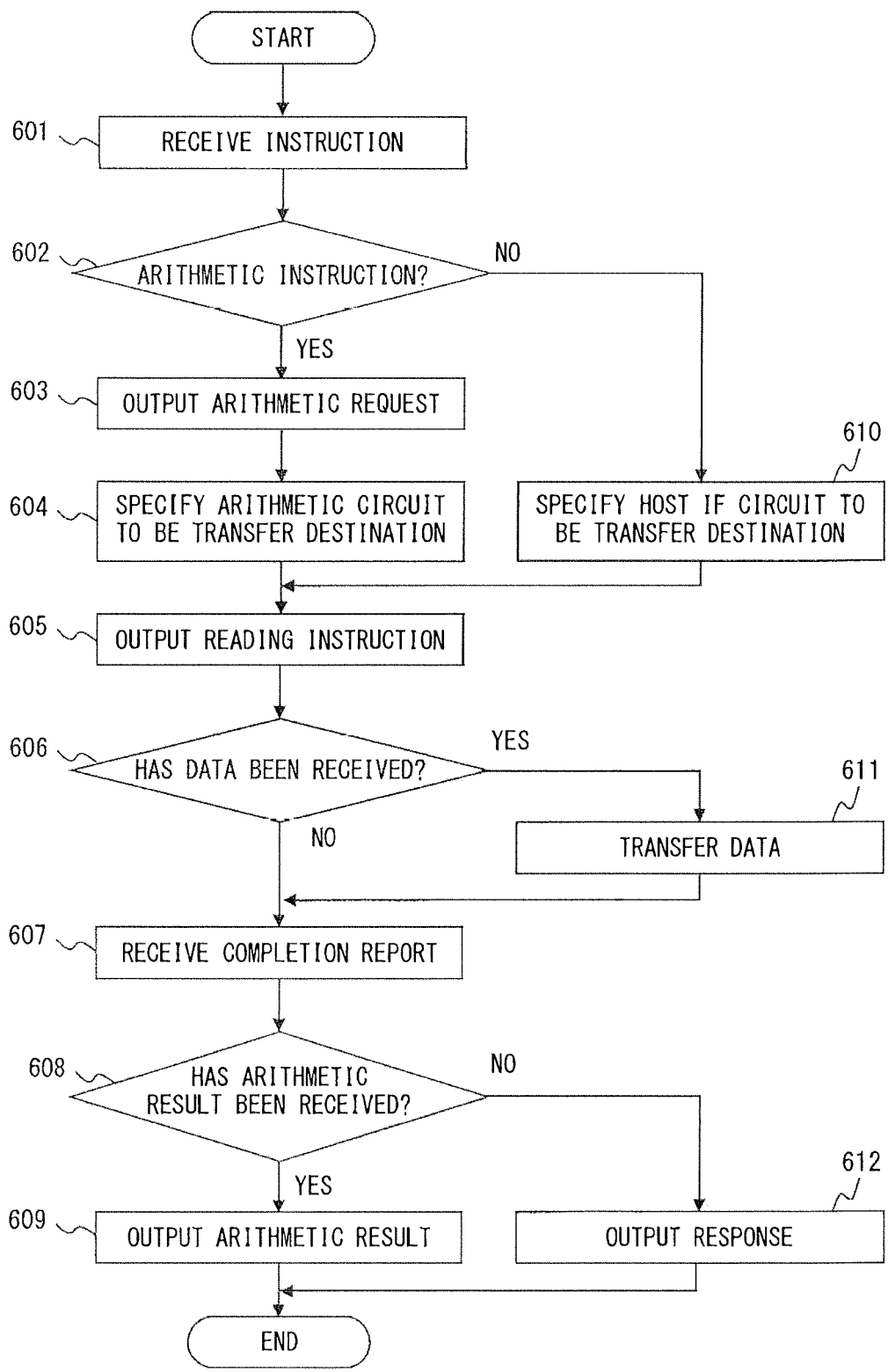
FIG. 6 is a flowchart of an operation of a host IF circuit.

FIG. 6 is a flowchart illustrating an example of an operation that is performed by the host IF circuit 541 of FIG. 5 upon receipt of a reading instruction or an arithmetic instruction. Upon receipt of an instruction from the host device 511 (step 601), the host IF circuit 541 checks whether the received instruction is a reading instruction or an arithmetic instruction (step 602).

When the received instruction is an arithmetic instruction (step 602, YES), the host IF circuit 541 outputs an arithmetic request to the arithmetic circuit 542 (step 603). The host IF circuit 541 generates a reading instruction that specifies the arithmetic circuit 542 to be a data transfer destination (step 604), and the host IF circuit 541 outputs the generated reading instruction to the flash memory IF circuit 543 (step 605).

When the received instruction is a reading instruction (step 602, NO), the host IF circuit 541 generates a reading instruction that specifies the host IF circuit 541 to be a data transfer destination (step 610). The host IF circuit 541 outputs the generated reading instruction to the flash memory IF circuit 543 (step 605).

The host IF circuit 541 checks whether data has been received from the flash memory IF circuit 543 (step 606). When data has not been received from the flash memory IF circuit 543 (step 606, NO), the host IF circuit 541 receives a completion report from the flash memory IF circuit 543 (step 607). When data has been received from the flash memory IF circuit 543 (step 606, YES), the host IF circuit 541 transfers the received data to the host device 511 (step 611), and receives a completion report from the flash memory IF circuit 543 (step 607).

The host IF circuit 541 checks whether an arithmetic result has been received from the arithmetic circuit 542 (step 608). When an arithmetic result has been received from the arithmetic circuit 542 (step 608, YES), the host IF circuit 541 outputs the received arithmetic result as a response to the arithmetic instruction to the host device 511 (step 609). The host IF circuit 541 may receive the arithmetic result from the arithmetic circuit 542 prior to the reception of the completion report of step 607.

When an arithmetic result has not been received from the arithmetic circuit 542 (step 608, NO), the host IF circuit 541 outputs a response to the reading instruction to the host device 511 (step 612). Examples of the response to the reading instruction include normal termination and the number of generated errors.

Figure 7:
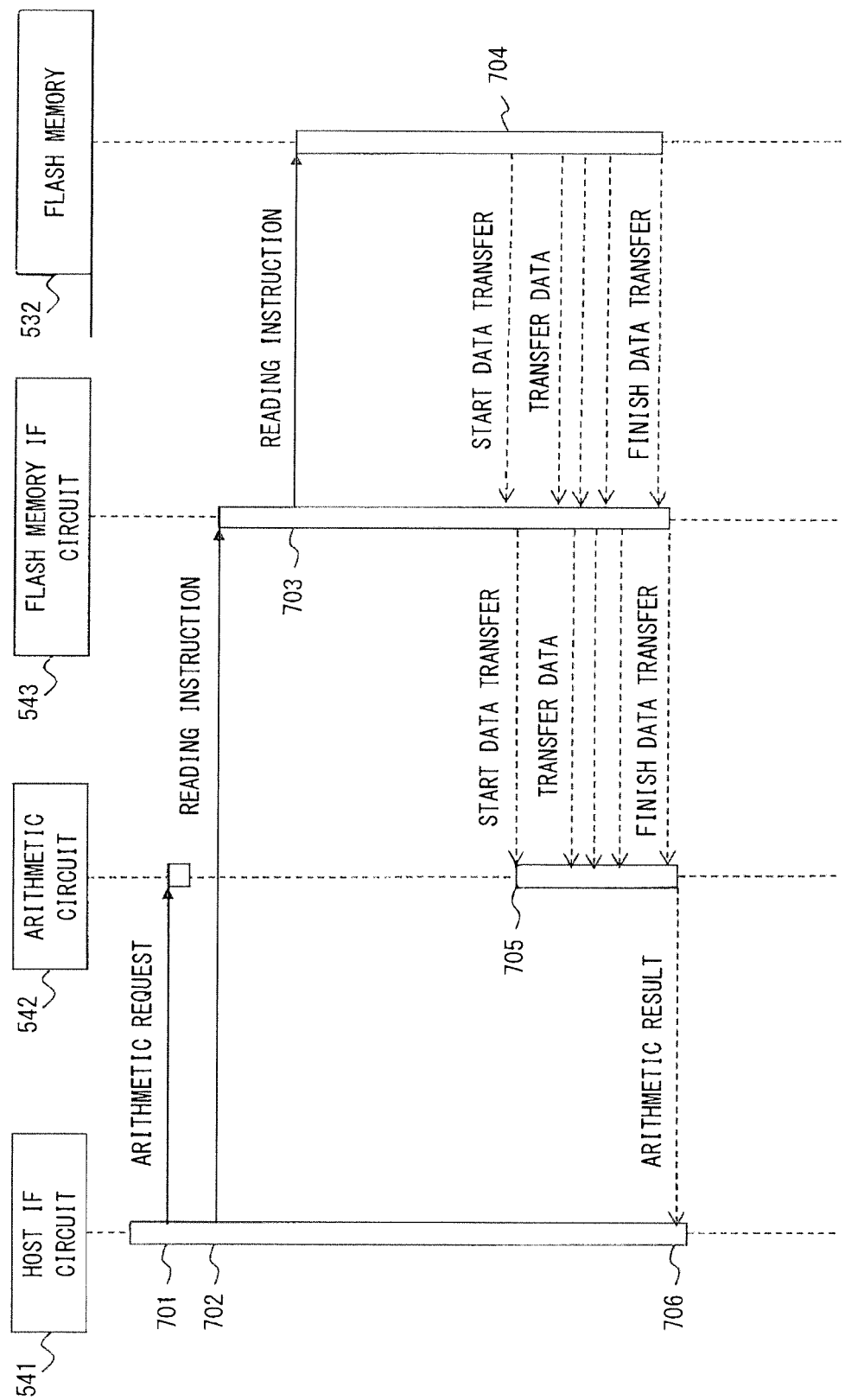
FIG. 7 illustrates an operation sequence in a case in which an arithmetic instruction is received.

FIG. 7 illustrates an example of an operation sequence in a case in which the host IF circuit 541 of FIG. 5 receives an arithmetic instruction. First, the host IF circuit 541 outputs an arithmetic request to the arithmetic circuit 542 (procedure 701), and outputs, to the flash memory IF circuit 543, a reading instruction that specifies the arithmetic circuit 542 to be a data transfer destination (procedure 702). The flash memory IF circuit 543 outputs the reading instruction to the flash memory 532 (procedure 703).

The flash memory 532 starts data transfer to transfer data in each prescribed unit to the flash memory IF circuit 543 in accordance with the received reading instruction (procedure 704). The flash memory IF circuit 543 starts data transfer to transfer the data received from the flash memory 532 in each prescribed unit to the arithmetic circuit 542 (procedure 705). The prescribed unit may be, for example, several tens of bytes.

The arithmetic circuit 542 performs an arithmetic operation using received data while receiving data from the flash memory IF circuit 543, and when data transfer from the flash memory IF circuit 543 is finished, the arithmetic circuit 542 outputs an arithmetic result to the host IF circuit 541 (procedure 706).

When the flash memory 532 finishes data transfer to the flash memory IF circuit 543, the flash memory 532 outputs a completion report to the flash memory IF circuit 543. Upon receipt of the completion report from the flash memory 532, the flash memory IF circuit 543 outputs the completion report to the host IF circuit 541. The completion report from the flash memory IF circuit 543 to the host IF circuit 541 may be output before procedure 706, or may be output after procedure 706.

By employing the information processing device 501 of FIG. 5, the arithmetic circuit 542 can perform an arithmetic operation while directly receiving data from the flash memory IF circuit 543, by outputting, to the flash memory IF circuit 543, a reading instruction that specifies the arithmetic circuit 542 to be a data transfer destination. Therefore, throughput with respect to an arithmetic instruction is almost the same as reading speed.

In addition, latency with respect to an arithmetic instruction increases due to the addition of arithmetic processing, but reading latency is sufficiently large, and therefore, in practice, the latency with respect to the arithmetic instruction is almost the same as the reading latency. As an example, when the arithmetic processing is search processing, the reading latency is about several hundred μs, whereas an increase due to the arithmetic processing is about several hundred ns.

Accordingly, the flash memory controller 531 can perform arithmetic processing in response to an arithmetic instruction at almost the same speed as the speed of data reading.

In addition, the SSD 512 of FIG. 5 is a software-defined SSD, and therefore the SSD 512 can directly control a flash memory by using software, and a DRAM does not need to be provided in the flash memory controller 531.

Figure 8:
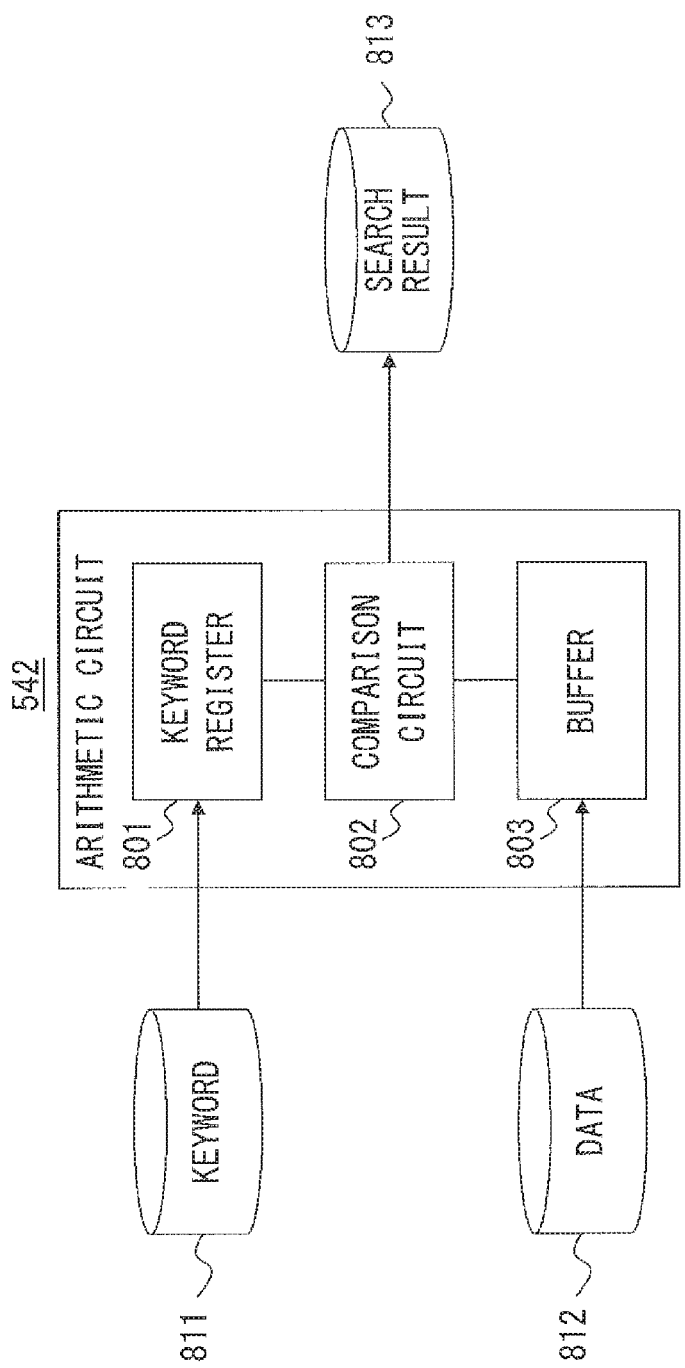
FIG. 8 is a block diagram of an arithmetic circuit that searches for data.

FIG. 8 illustrates an exemplary configuration of an arithmetic circuit 542 that searches for data. The arithmetic circuit 542 of FIG. 8 includes a keyword register 801, a comparison circuit 802, and a buffer 803. The control unit 521 of the host device 511 issues a search instruction including a search target to the SSD 512. As the search target, a keyword 811 is used, for example.

In a case in which the host IF circuit 541 of the flash memory controller 531 receives a search instruction including the keyword 811, the host IF circuit 541 outputs a search request including the keyword 811 to the arithmetic circuit 542. The arithmetic circuit 542 stores the keyword 811 included in the received search request in the keyword register 801, and stores data 812 of a prescribed unit that has been received from the flash memory IF circuit 543 in the buffer 803.

The comparison circuit 802 compares the keyword 811 stored in the keyword register 801 with the data 812 stored in the buffer 803, and checks whether data that matches the keyword 811 is included in the data 812. Accordingly, every time the data 812 of a prescribed unit is received from the flash memory IF circuit 543, a search process is performed. When the data 812 includes the keyword 811, the comparison circuit 802 records a position within the flash memory 532 in which the data that matches the keyword 811 has been stored.

When data transfer from the flash memory IF circuit 543 is finished, the comparison circuit 802 outputs a search result 813 including HIT or MISS to the host IF circuit 541. HIT indicates that the keyword 811 is included in data within the flash memory 532, and MISS indicates that the keyword 811 is not included in data within the flash memory 532. When the keyword 811 is included in the data, the search result 813 includes information indicating the position of the data within the flash memory 532, together with HIT.

By employing the arithmetic circuit 542 of FIG. 8, a search process in response to a search instruction can be performed at almost the same speed as the speed of reading data.

Figure 9:
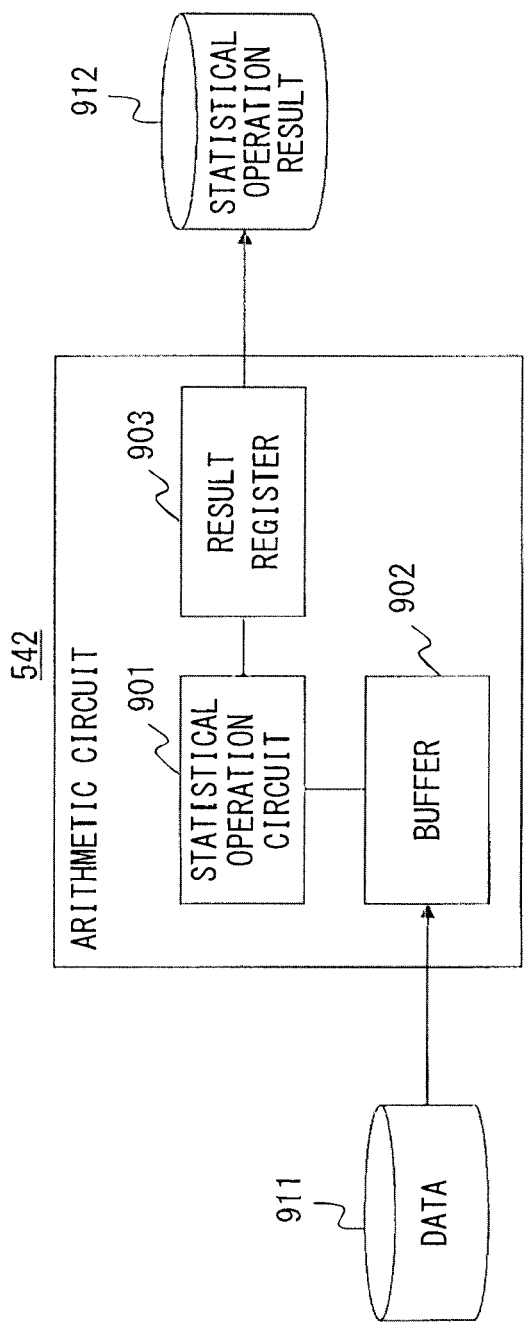
FIG. 9 is a block diagram of an arithmetic circuit that performs a statistical operation on data.

FIG. 9 illustrates an exemplary configuration of an arithmetic circuit 542 that performs a statistical operation on data. The arithmetic circuit 542 of FIG. 9 includes a statistical arithmetic circuit 901, a buffer 902, and a result register 903. The control unit 521 of the host device 511 issues a statistical arithmetic instruction that requests a statistical value to the SSD 512. As the statistical value, a total value, a mean value, a median, a maximum value, a minimum value, or the like is used. The statistical value may be the number (a count value) of pieces of data that satisfy a prescribed condition.

As an example, in a case in which the statistical arithmetic instruction is a summation instruction that requests a total value of data, the host IF circuit 541 of the flash memory controller 531 outputs a summation request to the arithmetic circuit 542. The arithmetic circuit 542 stores data 911 of a prescribed unit that has been received from the flash memory IF circuit 543 in the buffer 902. The result register 903 stores a total value of data, and an initial value of the total value is set to 0.

The statistical arithmetic circuit 901 calculates a total value of the data 911 stored in the buffer 902, and adds the calculated total value to the total value in the result register 903. Accordingly, every time the data 812 of a prescribed unit is received from the flash memory IF circuit 543, a summation process is performed, and the total value in the result register 903 is updated. When data transfer from the flash memory IF circuit 543 is finished, the result register 903 outputs a statistical operation result 912 including the total value to the host IF circuit 541.

Also in a case in which the statistical arithmetic instruction is an instruction that requests another statistical value such as a mean value of data, similarly to the case of the summation instruction, the result register 903 stores a statistical value of data. Every time the data 812 of a prescribed unit is received from the flash memory IF circuit 543, a statistical process is performed, and the statistical value in the result register 903 is updated.

By employing the arithmetic circuit 542 of FIG. 9, a statistical process in response to a statistical arithmetic instruction can be performed at almost the same speed as the speed of reading data.

FIG. 10 illustrates an exemplary configuration of an arithmetic circuit 542 that performs plural different arithmetic operations. The arithmetic circuit 542 of FIG. 10 includes an arithmetic circuit 1001-1 and an arithmetic circuit 1001-2. The arithmetic circuit 1001-1 and the arithmetic circuit 1001-2 are individual arithmetic circuits that perform different types of arithmetic operations. As an example, the arithmetic circuit 1001-1 may search for data, and the arithmetic circuit 1001-2 may perform a statistical operation on data.

In a case in which the host IF circuit 541 receives an arithmetic instruction from the host device 511, the host IF circuit 541 outputs an arithmetic request to an arithmetic circuit 1001-$i$ (i=1, 2) that performs an arithmetic operation that corresponds to the received arithmetic instruction. The host IF circuit 541 outputs a reading instruction that specifies the arithmetic circuit 1001-$i$ to be a data transfer destination to the flash memory IF circuit 543.

The flash memory IF circuit 543 outputs data received from the flash memory 532 to the arithmetic circuit 1001-$i$, and the arithmetic circuit 1001-$i$ performs an arithmetic operation by using the data received from the flash memory IF circuit 543, and outputs an arithmetic result to the host IF circuit 541. The host IF circuit 541 transfers the arithmetic result received from the arithmetic circuit 1001-$i$ to the host device 511.

In this case, in step 603 of FIG. 6, the host IF circuit 541 outputs an arithmetic request to an arithmetic circuit 1001-$i$ that performs an arithmetic operation that corresponds to the arithmetic instruction from among the arithmetic circuit 1001-1 and the arithmetic circuit 1001-2. In step 604, the host IF circuit 541 generates a reading instruction that specifies the arithmetic circuit 1001-$i$ that is an output destination of the arithmetic request to be a data transfer destination. In addition, in step 608, the host IF circuit 541 checks whether an arithmetic result has been received from the arithmetic circuit 1001-$i$ that is the output destination of the arithmetic request.

By employing the arithmetic circuit 542 of FIG. 10, an arithmetic circuit 1001-$i$ can be selected according to an arithmetic instruction, and an arithmetic operation that corresponds to the selected arithmetic circuit 1001-$i$ can be performed at almost the same speed as the speed of reading data.

Figure 11:
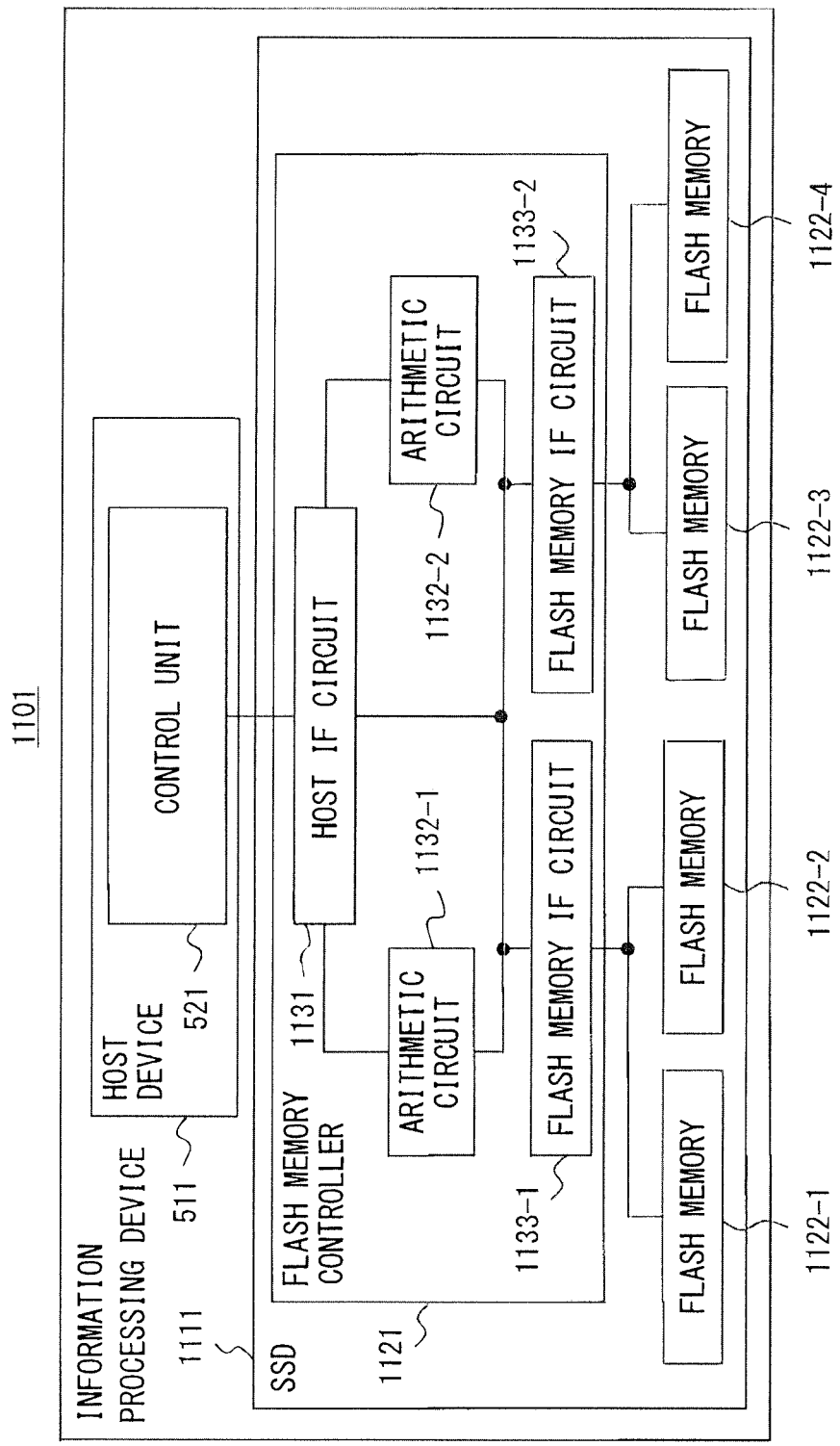
FIG. 11 is a block diagram of an information processing device that includes plural flash memory IF circuits.

FIG. 11 illustrates an exemplary configuration of an information processing device that includes plural flash memory IF circuits. An information processing device 1101 of FIG. 11 includes a host device 511 and an SSD 1111, and the host device 511 includes a control unit 521. The SSD 1111 is a software-defined SSD, and the SSD 1111 includes a flash memory controller 1121 and a flash memory 1122-1 to a flash memory 1122-4. The flash memory controller 1121 includes a host IF circuit 1131, an arithmetic circuit 1132-1, an arithmetic circuit 1132-2, a flash memory IF circuit 1133-1, and a flash memory IF circuit 1133-2.

The host IF circuit 1131 is connected to the control unit 521, the arithmetic circuit 1132-1, the arithmetic circuit 1132-2, the flash memory IF circuit 1133-1, and the flash memory IF circuit 1133-2. The flash memory IF circuit 1133-1 is connected to the host IF circuit 1131, the arithmetic circuit 1132-1, the arithmetic circuit 1132-2, the flash memory 1122-1, and the flash memory 1122-2. The flash memory IF circuit 1133-2 is connected to the host IF circuit 1131, the arithmetic circuit 1132-1, the arithmetic circuit 1132-2, the flash memory 1122-3, and the flash memory 1122-4.

Hereinafter, any of the flash memory 1122-1 to the flash memory 1122-4 may be referred to as a flash memory 1122. In addition, any of the flash memory IF circuit 1133-1 and the flash memory IF circuit 1133-2 may be referred to as a flash memory IF circuit 1133. Further, any of the arithmetic circuit 1132-1 and the arithmetic circuit 1132-2 may be referred to as an arithmetic circuit 1132.

The host IF circuit 1131, the arithmetic circuit 1132, the flash memory IF circuit 1133, and the flash memory 1122 respectively correspond to the host IF circuit 411, the arithmetic circuit 412, the memory IF circuit 413, and the memory 414 in FIG. 4.

An operation of the control unit 521 of the host device 511 is similar to the case of FIG. 5. In a case in which the host IF circuit 1131 of the flash memory controller 1121 receives a reading instruction from the host device 511, the host IF circuit 1131 outputs a reading instruction that specifies the host IF circuit 1131 to be a data transfer destination to the flash memory IF circuit 1133.

The flash memory IF circuit 1133 outputs the reading instruction to the flash memory 1122, and the flash memory 1122 outputs data to the flash memory IF circuit 1133. The flash memory IF circuit 1133 outputs the data received from the flash memory 1122 to the host IF circuit 1131, and the host IF circuit 1131 transfers the data received from the flash memory IF circuit 1133 to the host device 511.

In a case in which the host IF circuit 1131 receives an arithmetic instruction from the host device 511, the host IF circuit 1131-$i$ ($i$=1, 2), and outputs a reading instruction that specifies the arithmetic circuit 1132-$i$ to be a data transfer destination to a flash memory IF circuit 1133-$i$. The flash memory IF circuit 1133-$i$ outputs the reading instruction to the flash memory 1122, and the flash memory 1122 outputs data to the flash memory IF circuit 1133-$i$.

The flash memory IF circuit 1133-$i$ outputs the data received from the flash memory 1122 to the arithmetic circuit 1132-$i$, and the arithmetic circuit 1132-$i$ performs an arithmetic operation by using the data received from the flash memory IF circuit 1133-$i$, and outputs an arithmetic result to the host IF circuit 1131. The host IF circuit 1131 transfers the arithmetic result received from the arithmetic circuit 1132-$i$ to the host device 511.

By employing the information processing device 1101 of FIG. 11, arithmetic processing can be performed using a group of flash memories 1122 connected to each flash memory IF circuit 1133 as a target, by providing arithmetic circuits 1132 for the respective flash memory IF circuits 1133.

The configurations of the SSD 302 of FIG. 3, the SSD 401 of FIG. 4, the information processing device 501 of FIG. 5, and the information processing device 1101 of FIG. 11 are examples, and some components may be omitted or changed according to the purposes or conditions of an SSD or an information processing device. As an example, in the SSD 302, the information processing device 501, or the information processing device 1101, data may be stored by using another semiconductor memory such as a random access memory (RAM) instead of a flash memory.

In the SSD 302, the information processing device 501, or the information processing device 1101, the number of flash memories that are connected to each flash memory IF circuit is not limited to 2. The information processing device 501 may include a single flash memory 532, or may include three or more flash memories 532. The information processing device 1101 may include three or more arithmetic circuits 1132 and three or more flash memory IF circuits 1133. In addition, the information processing device 1101 may include five or more flash memories 1122.

The configuration of the arithmetic circuit 542 of FIG. 8 or FIG. 9 is an example, and the configuration of the arithmetic circuit 542 changes according to the type of an arithmetic operation. An arithmetic operation performed by the arithmetic circuit 542 may be a process for extracting data that is specified by a prescribed pattern.

The configuration of the arithmetic circuit 542 of FIG. 10 is an example, and the number of arithmetic circuits changes according to the purposes or conditions of an SSD or an information processing device. The arithmetic circuit 542 may include three or more arithmetic circuits that respectively perform three or more different arithmetic operations.

The flowchart of FIG. 6 is an example, and some processes may be omitted or changed according to the configuration or conditions of an SSD or an information processing device. The operation sequence of FIG. 7 is an example, and another operation may be performed according to the configuration or conditions of an SSD or an information processing device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A solid state drive comprising:
a memory that stores data;
a memory interface circuit that reads the data from the memory;
an arithmetic circuit that performs a prescribed arithmetic operation on the data read from the memory; and
a host interface circuit that checks whether an instruction received from a host device is a reading instruction or an arithmetic instruction upon receipt of the instruction from the host device, that outputs, when the instruction received from the host device is the arithmetic instruction, an arithmetic request to the arithmetic circuit and directly outputs a reading instruction to the memory interface circuit, the reading instruction including an instruction that specifies the arithmetic circuit to be a transfer destination of the data read from the memory so that the memory interface circuit transfers the data read from the memory to the arithmetic circuit, that receives, from the arithmetic circuit, an arithmetic result of the prescribed arithmetic operation performed on the data read from the memory via the memory interface circuit, and that outputs the arithmetic result to the host device.

2. The solid state drive according to claim 1, wherein the arithmetic circuit includes a plurality of individual arithmetic circuits that respectively perform plural different arithmetic operations, and the host interface circuit outputs the arithmetic request to a specific individual arithmetic circuit that performs the prescribed arithmetic operation that corresponds to the arithmetic instruction from among the plurality of individual arithmetic circuits, and receives the arithmetic result from the specific individual arithmetic circuit.

3. The solid state drive according to claim 1, wherein the arithmetic instruction is a search instruction including a search target, the prescribed arithmetic operation is an arithmetic operation to compare the data read from the memory with the search target, and the arithmetic result indicates whether the search target is included in the data read from the memory.

4. The solid state drive according to claim 1, wherein the arithmetic instruction is an arithmetic instruction to request a statistical value, the prescribed arithmetic operation is an arithmetic operation to calculate the statistical value of the data read from the memory, and the arithmetic result includes the statistical value calculated by the arithmetic circuit.

* * * * *